US012800893B2

(12) United States Patent
Su et al.

(10) Patent No.: US 12,800,893 B2
(45) Date of Patent: Nov. 17, 2026

(54) ZOOM PROJECTION LENS

(71) Applicant: SUN YANG OPTICS DEVELOPMENT CO., LTD., Taoyuan City (TW)

(72) Inventors: Yuan Hung Su, Taoyuan City (TW); Sheng Da Jiang, Taoyuan City (TW); Yu Hung Chou, Taoyuan City (TW); Sheng Che Wu, Taoyuan City (TW)

(73) Assignee: SUN YANG OPTICS DEVELOPMENT CO., LTD., Taoyuan City (TW)

( * ) Notice: Subject to any disclaimer, the term of this patent is extended or adjusted under 35 U.S.C. 154(b) by 256 days.

(21) Appl. No.: 18/615,262

(22) Filed: Mar. 25, 2024

(65) Prior Publication Data

US 2025/0298226 A1 Sep. 25, 2025

(51) Int. Cl.

| | |
|---|---|
| ***G02B 15/04*** | (2006.01) |
| ***G02B 15/14*** | (2006.01) |
| ***G02B 15/16*** | (2006.01) |
| ***G03B 21/14*** | (2006.01) |

(52) U.S. Cl.

CPC ......... *G02B 15/1461* (2019.08); *G02B 15/16* (2013.01); *G03B 21/142* (2013.01)

(58) Field of Classification Search

CPC .................................................. G02B 15/1461

USPC .................................................. 359/676–685

See application file for complete search history.

(56) References Cited

U.S. PATENT DOCUMENTS

| | | | | |
|---|---|---|---|---|
| 2013/0188155 | A1* | 7/2013 | Masui | G03B 21/2033 359/683 |
| 2020/0088977 | A1* | 3/2020 | Shiokawa | G02B 13/18 |
| 2021/0349293 | A1* | 11/2021 | Uehara | G02B 15/1441 |
| 2023/0213744 | A1* | 7/2023 | Katayose | G02B 15/20 359/683 |
| 2024/0241356 | A1* | 7/2024 | Saito | G02B 13/0045 |
| 2024/0427126 | A1* | 12/2024 | Komiyama | G02B 15/1461 |
| 2025/0093627 | A1* | 3/2025 | Hibino | G02B 15/1461 |
| 2025/0155694 | A1* | 5/2025 | Ichimura | G02B 9/64 |
| 2025/0172790 | A1* | 5/2025 | Fujita | G02B 15/1461 |
| 2025/0244566 | A1* | 7/2025 | Ochiai | G02B 15/177 |

* cited by examiner

*Primary Examiner* — Darryl J Collins

(74) *Attorney, Agent, or Firm* — BACON & THOMAS, PLLC

(57) ABSTRACT

A zoom projection lens sequentially comprising: a front fixed lens group, a zoom adjusting lens group, multiple zoom lens groups, and a rear fixed lens group, for satisfying 1<Ft/Fw<2 and 10<OAL/IMH<24, Ft is the focal length at the telephoto end, Fw is the focal length at the wide-angle end, OAL is the distance from the first lens of the lens to the focal plane, and IMH is the half height of the focal plane. Whereby, achieving a zoom projection lens meets the projection requirements of zoom projection and maintain the quality of projection imaging at the same time.

4 Claims, 12 Drawing Sheets

10

20

ZOOM PROJECTION LENS

BACKGROUND OF THE INVENTION

1. Field of the Invention

The present invention relates to a zoom projection lens, particularly to one that meets the requirements of zoom projection and maintain the quality of projection imaging.

2. Description of the Related Art

There is a corresponding relationship between the brightness of the projector and the brightness of the environment. When using a projector in a brighter environment, a projector with higher brightness is required. Furthermore, in addition to meeting the aforementioned requirements for high brightness projection, lens groups usually required zooming depending on the installation position of the projector to adjust the projection image to an appropriate size. Therefore, making the projection lens meet the projection requirements of high brightness and zoom at the same time, and can also take into account the projection imaging quality are the goal of the present invention.

SUMMARY OF THE INVENTION

A primary objective of the present invention is to provide a zoom projection lens which meet the projection requirements of zoom projection and maintain the quality of projection imaging at the same time.

To achieve the objects mentioned above, the present invention from the magnifying side to the narrowing side of the lens sequentially comprising: a front fixed lens group, a zoom adjusting lens group, multiple zoom lens groups, and a rear fixed lens group, for satisfying $1<Ft/Fw<2$ and $10<OAL/IMH<24$, Ft is the focal length at the telephoto end, Fw is the focal length at the wide-angle end, OAL is the distance from the first lens of the lens to the focal plane, and IMH is the half height of the focal plane.

Also, wherein the zoom adjusting lens group includes at least a positive diopter. The zoom lens group with the most lens of the multiple zoom lens groups is having positive diopter and includes at least two lens with positive diopter, wherein there two zoom lens groups in the multiple zoom lens groups, and each of these two includes at least one lens with positive diopter.

Moreover, the front fixed lens group has positive diopter, the zoom adjusting lens group has negative diopter, and multiple zoom lens groups include in sequence from the zoom adjusting lens group: a first zoom lens group with positive diopter, a second zoom lens group with positive diopter, a third zoom lens group with negative diopter and a fourth zoom lens group with positive diopter, and the rear fixed lens group has positive diopter, wherein the fourth zoom lens group is the zoom lens group with the most lenses among multiple zoom lens groups.

Also, the front fixed lens group has negative diopter, the zoom adjusting lens group has negative diopter, and multiple zoom lens groups include in sequence from the zoom adjusting lens group: a first zoom lens group with positive diopter, a second zoom lens group with positive diopter, a third zoom lens group with negative diopter, a fourth zoom lens group with positive diopter and a fifth zoom lens group with positive diopter, and the rear fixed lens group has positive diopter, wherein the fourth zoom lens group is the zoom lens group with the most lenses among multiple zoom lens groups.

DETAILED DESCRIPTION OF THE PREFERRED EMBODIMENT

Figure 1A:
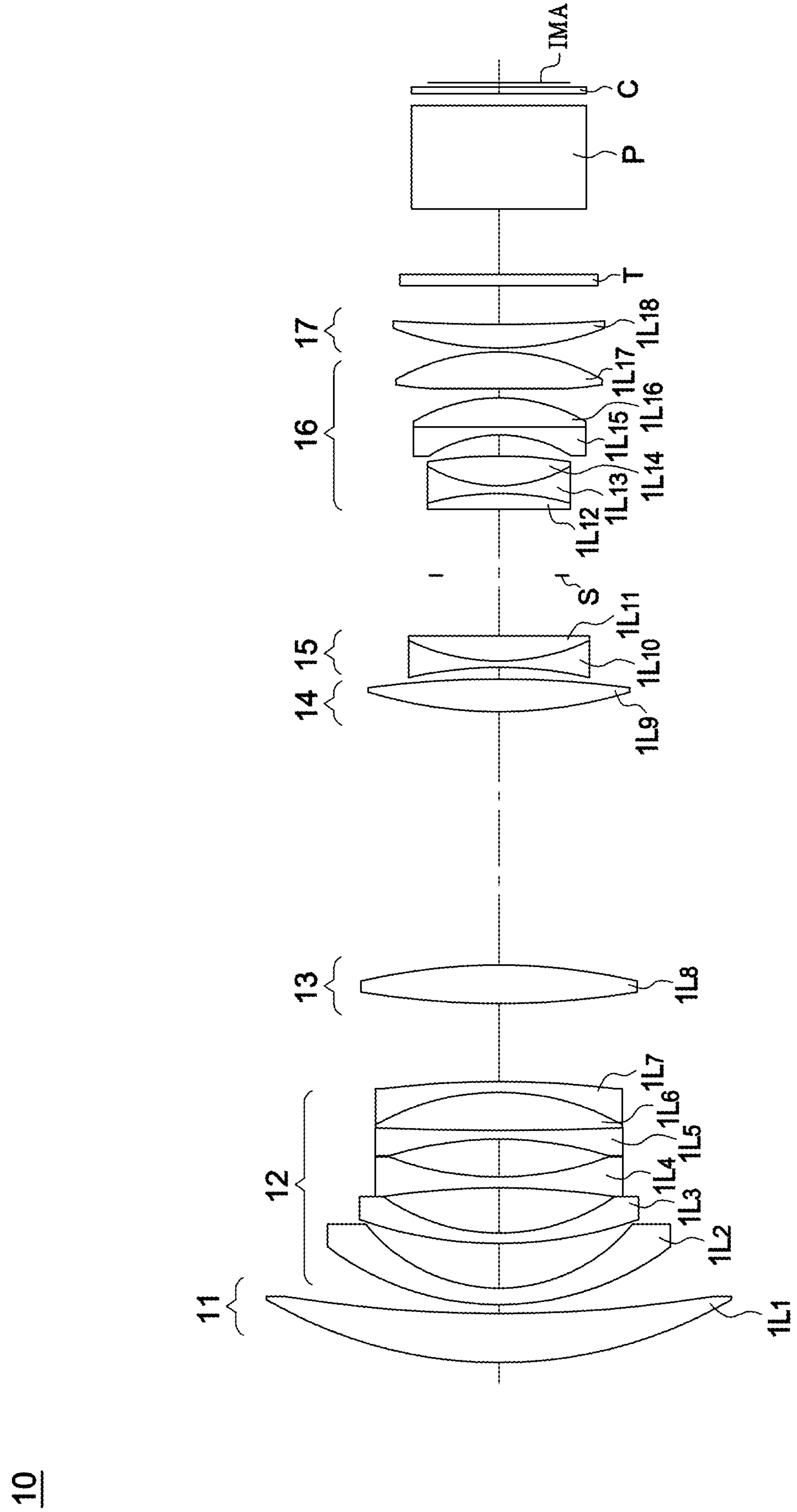
FIG. 1A is a schematic diagram illustrating lenses arrangement of the wide-angle end of the first embodiment of the present invention.
Figure 1B:
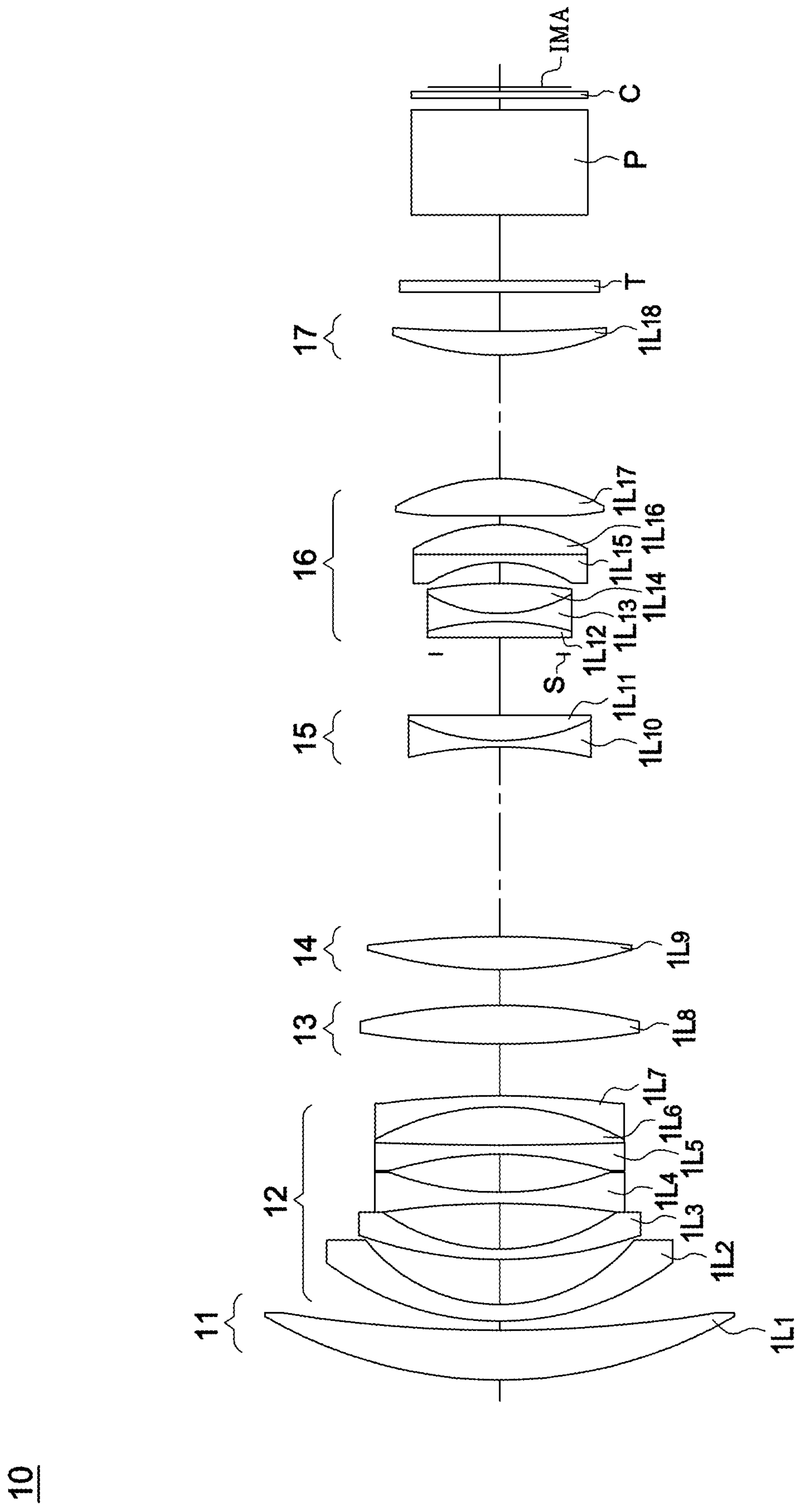
FIG. 1B is a schematic diagram illustrating lenses arrangement of the telephoto end of the first embodiment of the present invention.

Referring to FIGS. 1A and 1B, the first embodiment of the present invention includes a zoom projection lens 10, which from the magnifying side to the narrowing side of the lens sequentially comprising:

- a front fixed lens group 11, which diopter is positive and has a first lens 1G1;
- a zoom adjusting lens group 12, which diopter is negative and sequentially has a second lens 1G2, a third lens 1G3, a fourth lens 1G4, a fifth lens 1G5, a sixth lens 1G6 and a seventh lens 1G7, and the sixth lens 1G6 has positive diopter;
- a first zoom lens group 13, which diopter is positive and has an eighth lens 1G8, and the eighth lens 1G8 has positive diopter;
- a second zoom lens group 14, which diopter is positive and has a ninth lens 1G9, and the ninth lens 1G9 has positive diopter;

- a third zoom lens group 15, which diopter is s negative and sequentially has a tenth lens 1G10 and an eleventh lens 1G11, and the eleventh lens 1G11 has positive diopter;
- an aperture S;
- a fourth zoom lens group 16, which diopter is positive and sequentially has a twelfth lens 1G12, a thirteenth lens 1G13, a fourteenth lens 1G14, a fifteenth lens 1G15, a sixteenth lens 1G16 and a seventeenth lens 1G17, and the twelfth lens 1G12, the sixteenth lens 1G16 and the seventeenth lens 1G17 have positive diopter;
- a rear fixed lens group 17, which diopter is positive and has an eighteenth lens 1G18; and
- a transmissive smooth picture actuator T is arranged sequentially behind the eighteenth lens 1G18, and sequentially arranges a prism P, a cover glass C and an image source IMA behind the transmissive smooth picture actuator T.

Whereby satisfying $1<Ft/Fw<2$ and $10<OAL/IMH<24$, Ft is the focal length at the telephoto end, Fw is the focal length at the wide-angle end, OAL is the distance from the first lens of the lens to the focal plane, and IMH is the half height of the focal plane.

The lens parameters design of the zoom projection lens 10 are shown in Table 1 below:

| | | Thickness(mm) | | | |
|---|---|---|---|---|---|
| Comment | Radius(mm) | Wide | Tele | Nd | Vd |
| 1G1 | 85.02 | 9.11 | | 1.73 | 54.67 |
| | 269.45 | 1.88 | 1.94 | | |
| 1G2 | 53.11 | 2.90 | | 1.76 | 52.33 |
| | 31.21 | 8.26 | | | |
| 1G3 | 81.25 | 1.80 | | 1.76 | 52.33 |
| | 37.91 | 8.55 | | | |
| 1G4 | −141.25 | 1.80 | | 1.85 | 23.79 |
| | 56.13 | 6.81 | | | |
| 1G5 | −80.88 | 2.00 | | 1.73 | 54.67 |
| 1G6 | 558.58 | 7.10 | | 1.85 | 23.79 |
| 1G7 | −45.68 | 1.80 | | 1.73 | 54.67 |
| | −215.85 | 14.89 | 9.94 | | |
| 1G8 | 168.38 | 7.00 | | 1.81 | 33.29 |
| | −105.76 | 47.09 | 6.43 | | |
| 1G9 | 82.50 | 6.16 | | 1.60 | 65.46 |
| | −163.78 | 1.95 | 34.78 | | |
| 1G10 | −81.28 | 1.35 | | 1.55 | 45.83 |
| 1G11 | 37.48 | 4.77 | | 1.80 | 46.57 |
| | −795.26 | 11.18 | | | |
| S | Plane | 12.32 | 2.98 | | |
| 1G12 | 456.04 | 3.34 | | 1.76 | 52.33 |
| 1G13 | −42.22 | 1.10 | | 1.76 | 26.61 |
| 1G14 | 25.17 | 5.49 | | 1.50 | 81.61 |
| | −81.07 | 3.95 | | | |
| 1G15 | −23.55 | 1.10 | | 1.81 | 33.29 |
| 1G16 | 324.52 | 5.60 | | 1.50 | 81.61 |
| | −30.77 | 1.83 | | | |
| 1G17 | 355.02 | 7.00 | | 1.59 | 61.25 |
| | −36.83 | 0.71 | 22.78 | | |
| 1G18 | 54.08 | 4.17 | | 1.95 | 17.94 |
| | 310.58 | 7.44 | | | |
| T | Plane | 2.00 | | 1.52 | 58.57 |
| | Plane | 12.26 | | | |
| P | Plane | 19.25 | | 1.52 | 64.14 |
| | Plane | 2.36 | | | |
| C | Plane | 1.10 | | 1.52 | 64.14 |
| | Plane | 0.70 | | | |

Figure 1C:
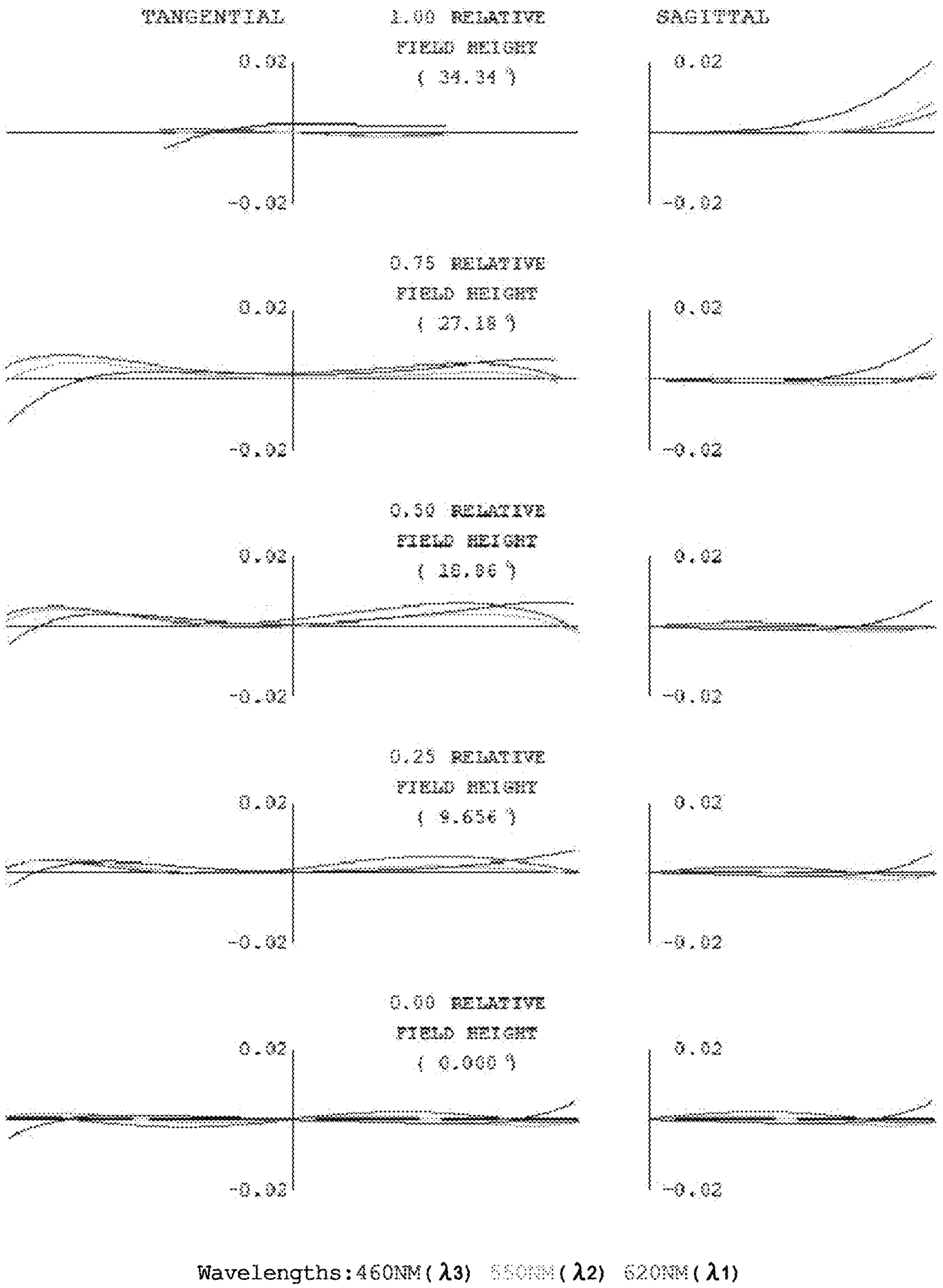
FIG. 1C is a graph illustrating the ray aberration diagram of the wide-angle end of the first embodiment of the present invention.

FIG. 1C is a graph illustrating the ray aberration diagram of the wide-angle end of the zoom projection lens 10 uses a first wavelength λ1 of 620 nm, a second wavelength λ2 of 550 nm and a third wavelength λ3 of 460 nm to match relative field heights, which are 1.00, 0.75, 0.50, 0.25, 0.00, to respectively simulate the corresponding ray aberrations of different Y-fan rays and X-fan rays, so that the relative field heights of 1.00, 0.75, 0.50, 0.25 and 0.00 present as half viewing angles of 34.34°, 27.18°, 18.86°, 9.656° and 0.000° respectively, and viewing the ray aberration diagram can tell the maximum aberration at each field of view point is controlled within the range of −0.02 mm~0.02 mm.

Figure 1D:
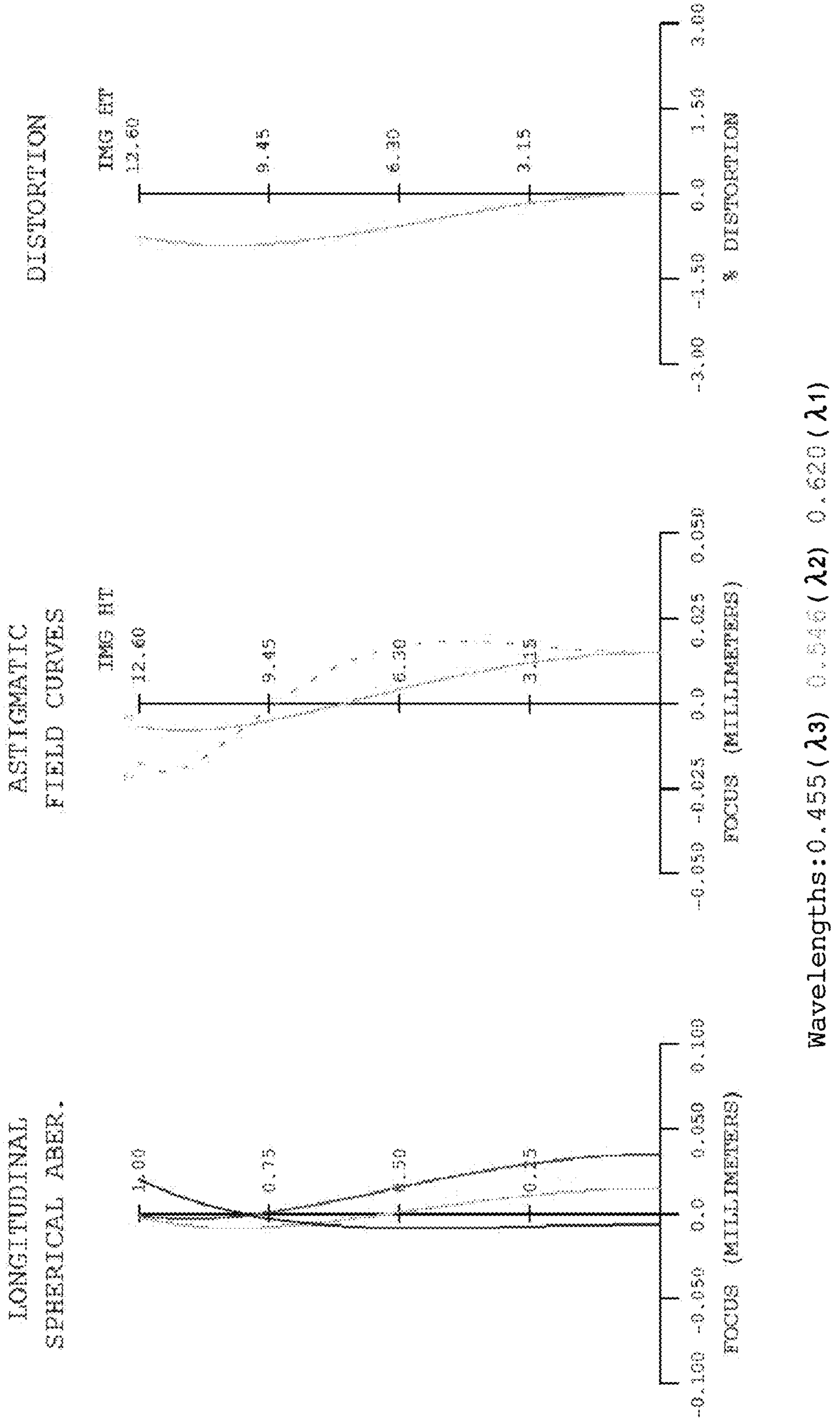
FIG. 1D is a graph illustrating the longitudinal spherical aberration diagram, astigmatism diagram and distortion diagram of the wide-angle end of the first embodiment of the present invention.

FIG. 1D is a graph illustrating the longitudinal spherical aberration diagram, astigmatism diagram and distortion diagram of the wide-angle end of the zoom projection lens 10; the longitudinal spherical aberration diagram shows the focus deviation of ray of different wavelengths after passing through the lens. From the longitudinal spherical aberration diagram can tell that the maximum focus deviation of each reference wavelength is controlled within the range of −0.010 mm~0.040 mm; the curves T and S of the astigmatic field curves are respectively the tangential field curvature characteristic curve and the sagittal field curvature characteristic curve. According to the astigmatic field curves knows that the tangential field curvature value and sagittal field curvature value at the 550 nm wavelength are controlled within the range of −0.025 mm~0.025 mm; the distortion diagram shows that the distortion at the 550 nm wavelength is controlled within the range of −1.50~0%.

Figure 1E:
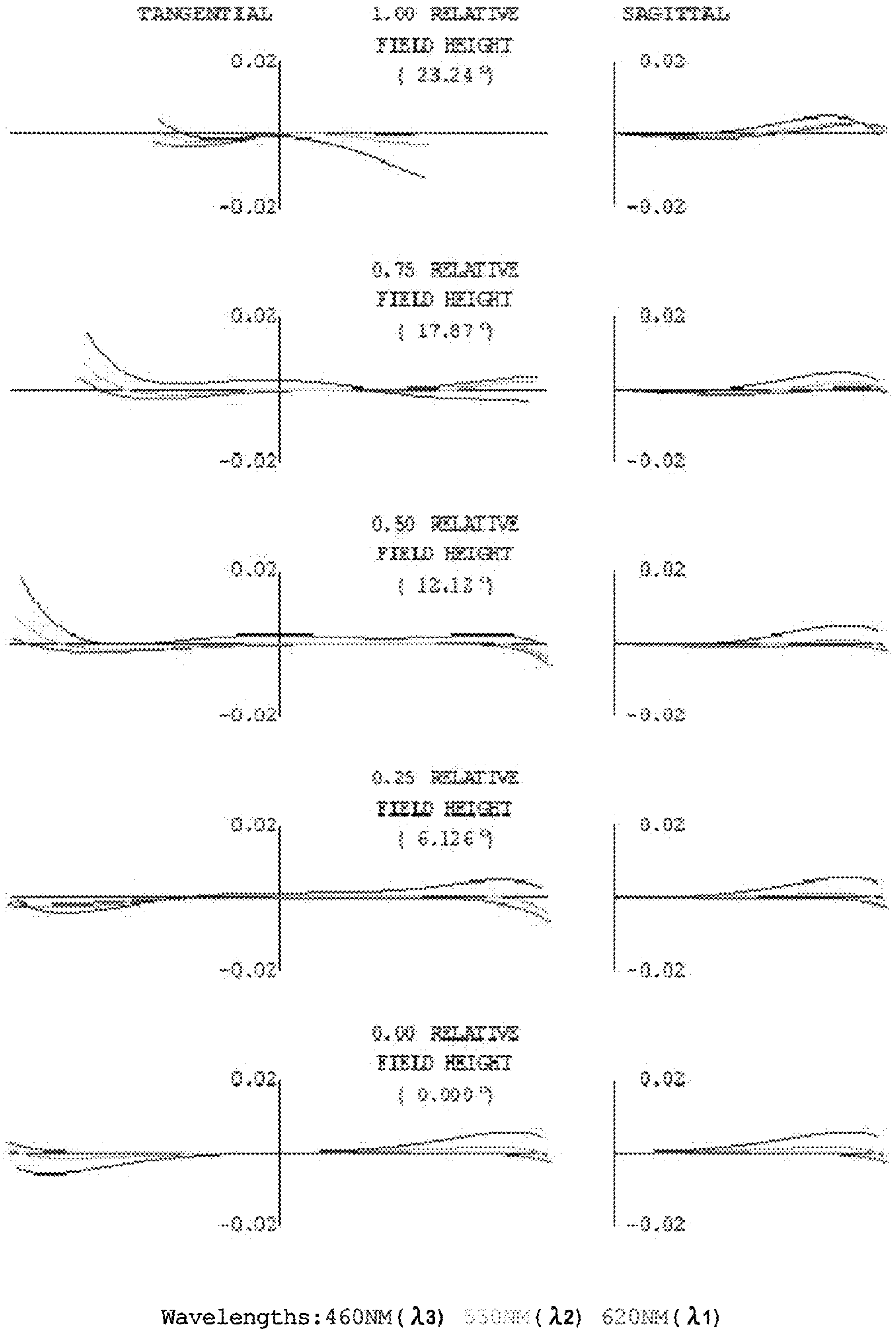
FIG. 1E is a graph illustrating the ray aberration diagram of the telephoto end of the first embodiment of the present invention.

FIG. 1E is a graph illustrating the ray aberration diagram of the telephoto end of the zoom projection lens 10 uses a first wavelength λ1 of 620 nm, a second wavelength λ2 of 550 nm and a third wavelength λ3 of 460 nm to match relative field heights, which are 1.00, 0.75, 0.50, 0.25, 0.00, to respectively simulate the corresponding ray aberrations of different Y-fan rays and X-fan rays, so that the relative field heights of 1.00, 0.75, 0.50, 0.25 and 0.00 present as half viewing angles of 24.24°, 17.87°, 12.12°, 6.126° and 0.000° respectively, and viewing the ray aberration diagram can tell the maximum aberration at each field of view point is controlled within the range of −0.02 mm~0.02 mm.

Figure 1F:
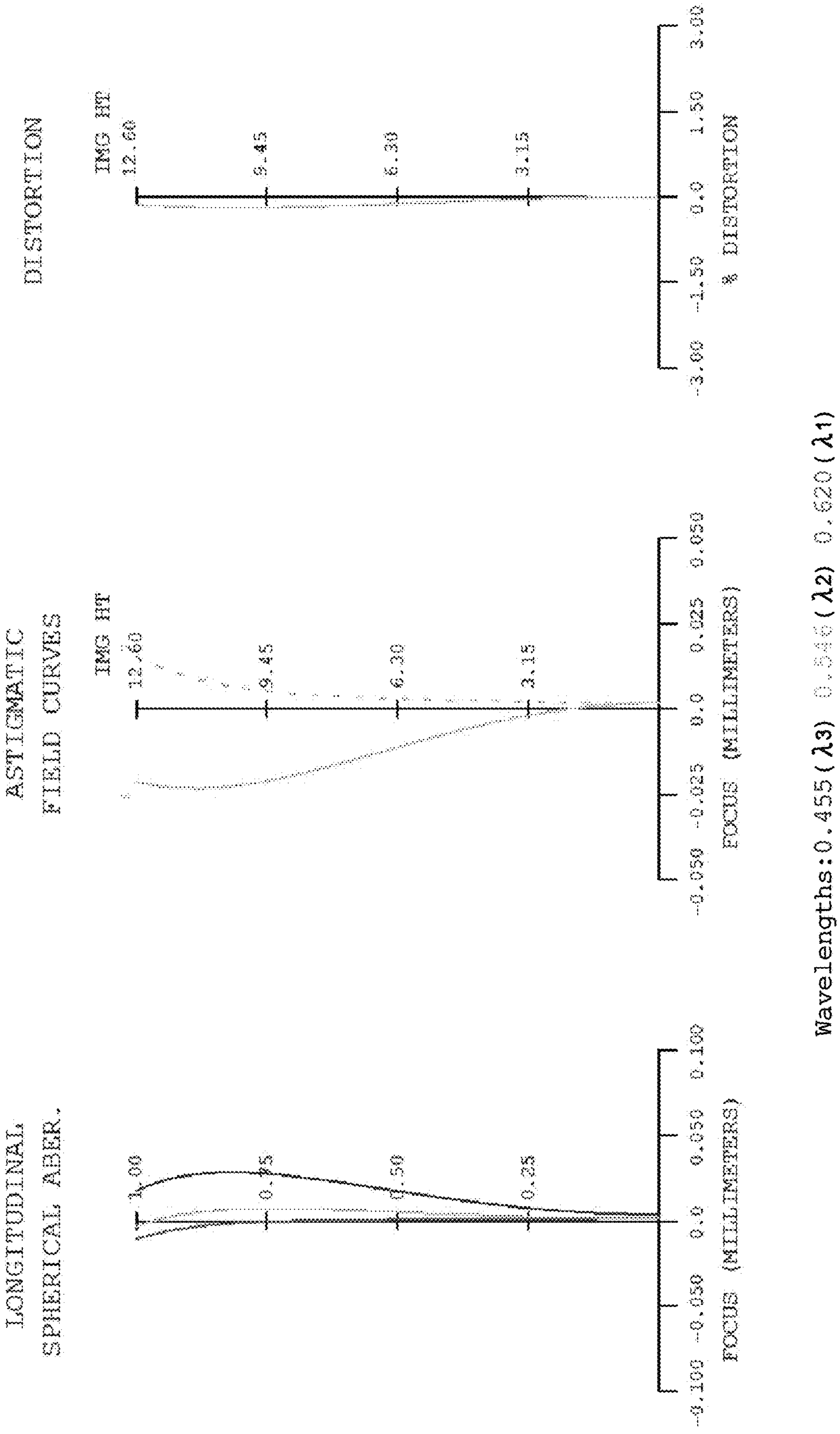
FIG. 1F is a graph illustrating the longitudinal spherical aberration diagram, astigmatism diagram and distortion diagram of the telephoto end of the first embodiment of the present invention.

FIG. 1F is a graph illustrating the longitudinal spherical aberration diagram, astigmatism diagram and distortion diagram of the wide-angle end of the zoom projection lens 10; From the longitudinal spherical aberration diagram can tell that the maximum focus deviation of each reference wavelength is controlled within the range of −0.010 mm~0.040 mm; the curves T and S of the astigmatic field curves are respectively the tangential field curvature characteristic curve and the sagittal field curvature characteristic curve. According to the astigmatic field curves knows that the tangential field curvature value and sagittal field curvature value at the 550 nm wavelength are controlled within the range of −0.025 mm~0.020 mm; the distortion diagram shows that the distortion at the 550 nm wavelength is controlled within the range of −0.50~0%.

Figure 2A:
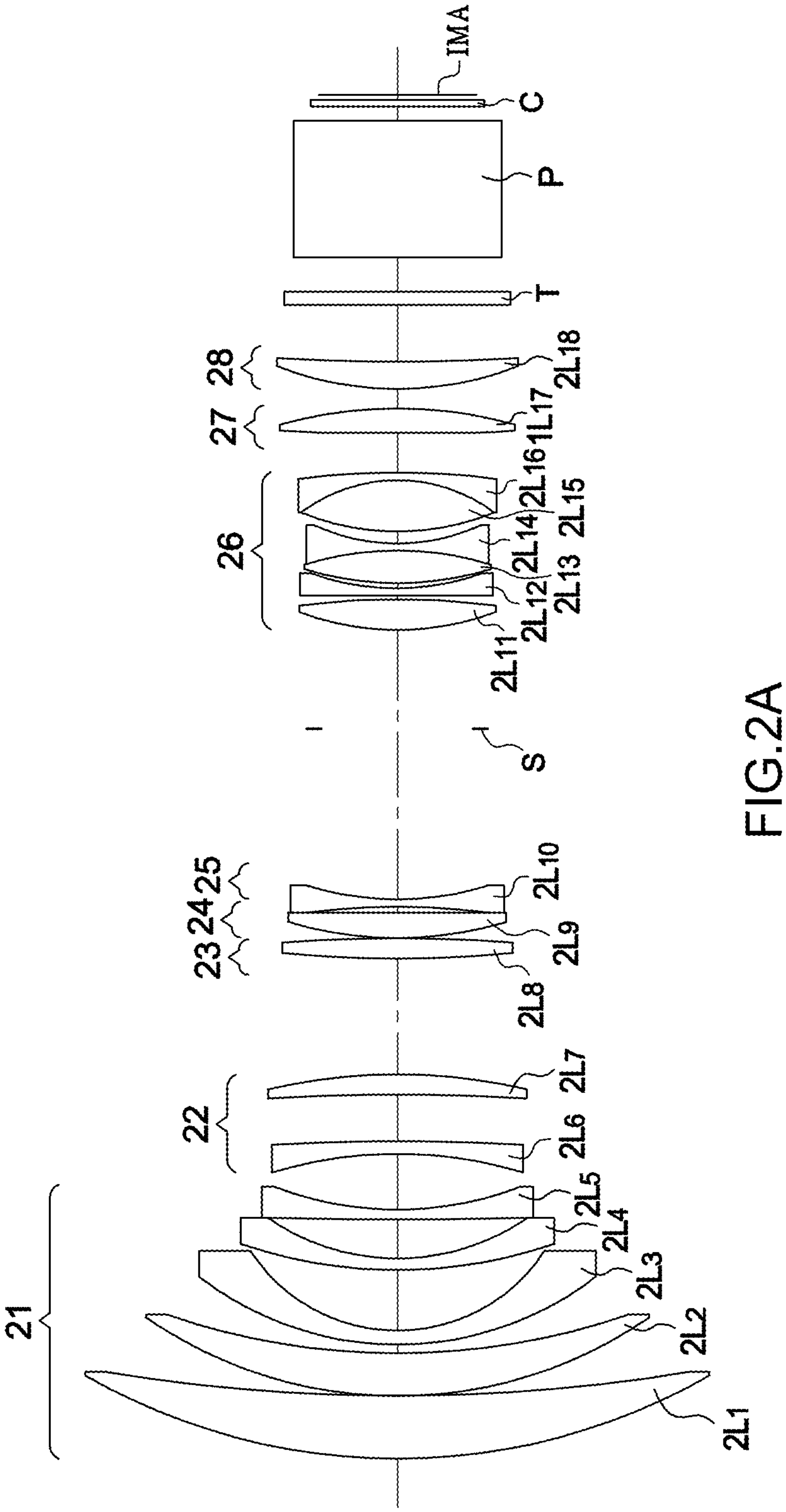
FIG. 2A is a schematic diagram illustrating lenses arrangement of the wide-angle end of the second embodiment of the present invention.
Figure 2B:
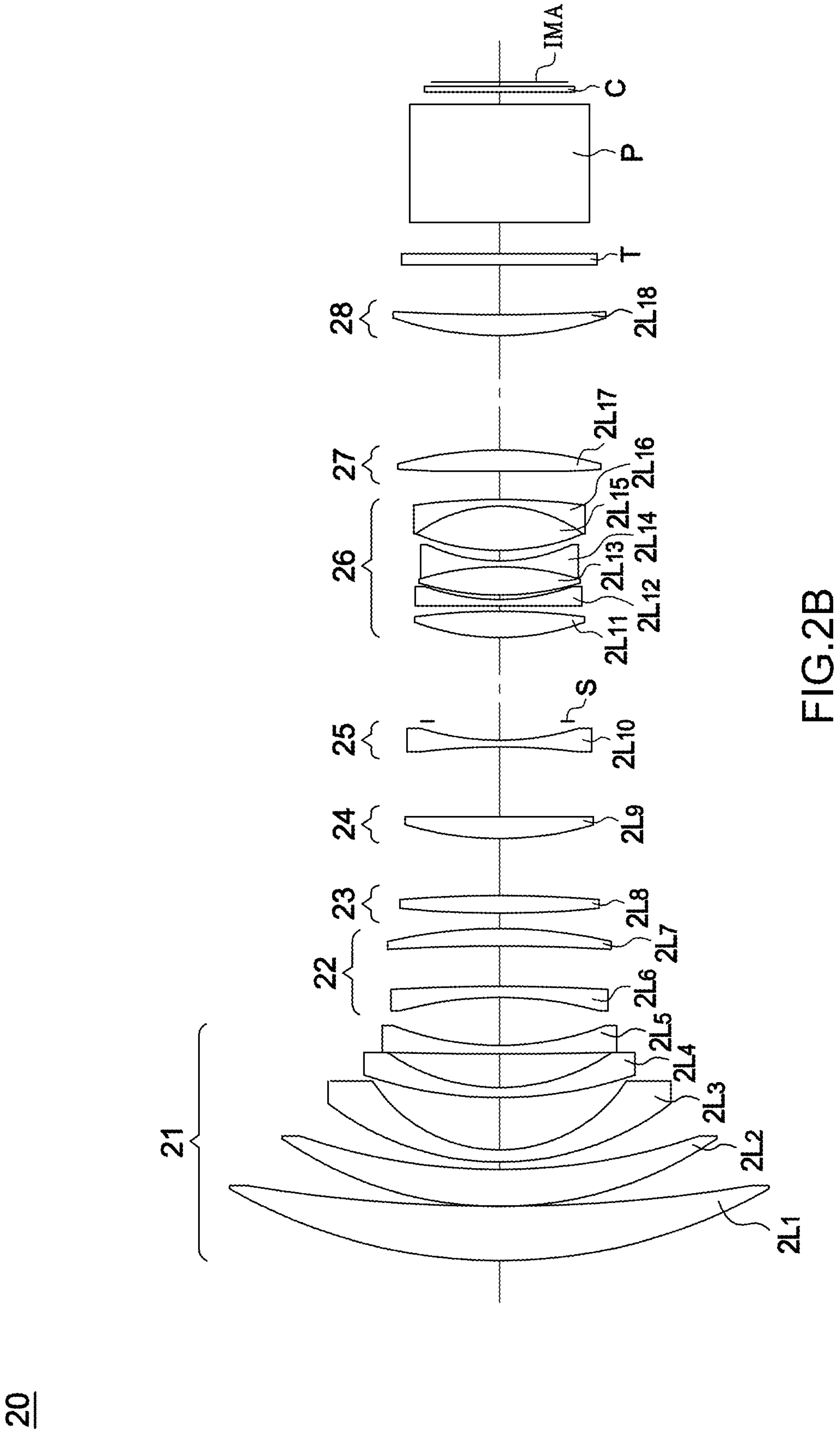
FIG. 2B is a schematic diagram illustrating lenses arrangement of the telephoto end of the second embodiment of the present invention.

Referring to FIGS. 2A and 2B, the second embodiment of the present invention includes a zoom projection lens 20, which from the magnifying side to the narrowing side of the lens sequentially comprising:

- a front fixed lens group 21, which diopter is negative and sequentially has a first lens 1G1, a second lens 2G2, a third lens 2G3, a fourth lens 2G4 and a fifth lens 2G5;
- a zoom adjusting lens group 22, which diopter is negative and sequentially has a sixth lens 2G6 and a seventh lens 2G7, and the seventh lens 2G7 has positive diopter;
- a first zoom lens group 23, which diopter is positive and has an eighth lens 2G8, and the eighth lens 2G8 has positive diopter;
- a second zoom lens group 24, which diopter is positive and has a ninth lens 2G9, and the ninth lens 2G9 has positive diopter;

a third zoom lens group 25, which diopter is s negative and has a tenth lens 2G10;

an aperture S;

a fourth zoom lens group 26, which diopter is positive and sequentially has an eleventh lens 2G11, a twelfth lens 2G12, a thirteenth lens 2G13, a fourteenth lens 2G14, a fifteenth lens 2G15 and a sixteenth lens 2G16, and the eleventh lens 2G11, the thirteenth lens 2G13 and the fifteenth lens 2G15 have positive diopter;

a fifth zoom lens group 27, which diopter is positive and has a seventeenth lens 2G17, and the seventeenth lens 2G17 has positive diopter;

a rear fixed lens group 28, which diopter is positive and has an eighteenth lens 2G18; and a transmissive smooth picture actuator T is arranged sequentially behind the eighteenth lens 2G18, and sequentially arranges a prism P, a cover glass C and an image source IMA behind the transmissive smooth picture actuator T.

Whereby satisfying $1<Ft/Fw<2$ and $10<OAL/IMH<24$, Ft is the focal length at the telephoto end, Fw is the focal length at the wide-angle end, OAL is the distance from the first lens of the lens to the focal plane, and IMH is the half height of the focal plane.

The lens parameters design of the zoom projection lens 20 are shown in Table 2 below:

| | | Thickness(mm) | | | |
|---|---|---|---|---|---|
| Comment | Radius(mm) | Wide | Tele | Nd | Vd |
| 2G1 | 109.35 | 11.88 | | 1.52 | 64.21 |
| | 336.10 | 0.20 | | | |
| 2G2 | 77.29 | 8.14 | | 1.49 | 70.42 |
| | 128.20 | 1.54 | | | |
| 2G3 | 55.90 | 2.64 | | 1.64 | 60.21 |
| | 30.62 | 11.64 | | | |
| 2G4 | 87.87 | 2.00 | | 1.73 | 54.67 |
| | 38.08 | 7.69 | | | |
| 2G5 | 687.96 | 1.74 | | 1.59 | 68.35 |
| | 56.12 | 10.78 | 11.37 | | |
| 2G6 | −67.18 | 2.11 | | 1.85 | 23.79 |
| | −734.44 | 9.11 | | | |
| 2G7 | −313.64 | 3.83 | | 1.81 | 25.48 |
| | −92.13 | 21.84 | 3.09 | | |
| 2G8 | 136.38 | 4.07 | | 1.85 | 23.79 |
| | −308.80 | 0.41 | 12.51 | | |
| 2G9 | 70.79 | 4.44 | | 1.83 | 37.23 |
| | −1691.61 | 1.27 | 15.83 | | |
| 2G10 | −148.78 | 1.35 | | 1.49 | 70.42 |
| | 49.04 | 32.93 | 4.44 | | |
| S | Plane | 18.56 | | | |
| 2G11 | 45.60 | 6.09 | | 1.74 | 44.90 |
| | −113.03 | 0.66 | | | |
| 2G12 | −1409.35 | 1.30 | | 1.65 | 33.90 |
| | 43.29 | 0.79 | | | |
| 2G13 | 51.85 | 6.59 | | 1.59 | 68.35 |
| 2G14 | −48.15 | 1.30 | | 1.78 | 25.72 |
| | 36.22 | 2.27 | | | |
| 2G15 | 43.53 | 9.59 | | 1.50 | 81.59 |
| 2G16 | −26.76 | 1.35 | | 1.81 | 25.48 |
| | −163.81 | 7.76 | 6.73 | | |
| 2G17 | 933.32 | 4.53 | | 1.92 | 20.88 |
| | −79.65 | 4.40 | 25.42 | | |
| 2G18 | 64.92 | 4.53 | | 1.95 | 17.94 |
| | 239.54 | 4.51 | | | |
| T | Plane | 2.00 | | 1.52 | 58.59 |
| | Plane | 6.99 | | | |
| P | Plane | 26.00 | | 1.52 | 64.14 |
| | Plane | 2.80 | | | |
| C | Plane | 1.10 | | 1.49 | 70.24 |
| | Plane | 0.51 | | | |

Figure 2C:
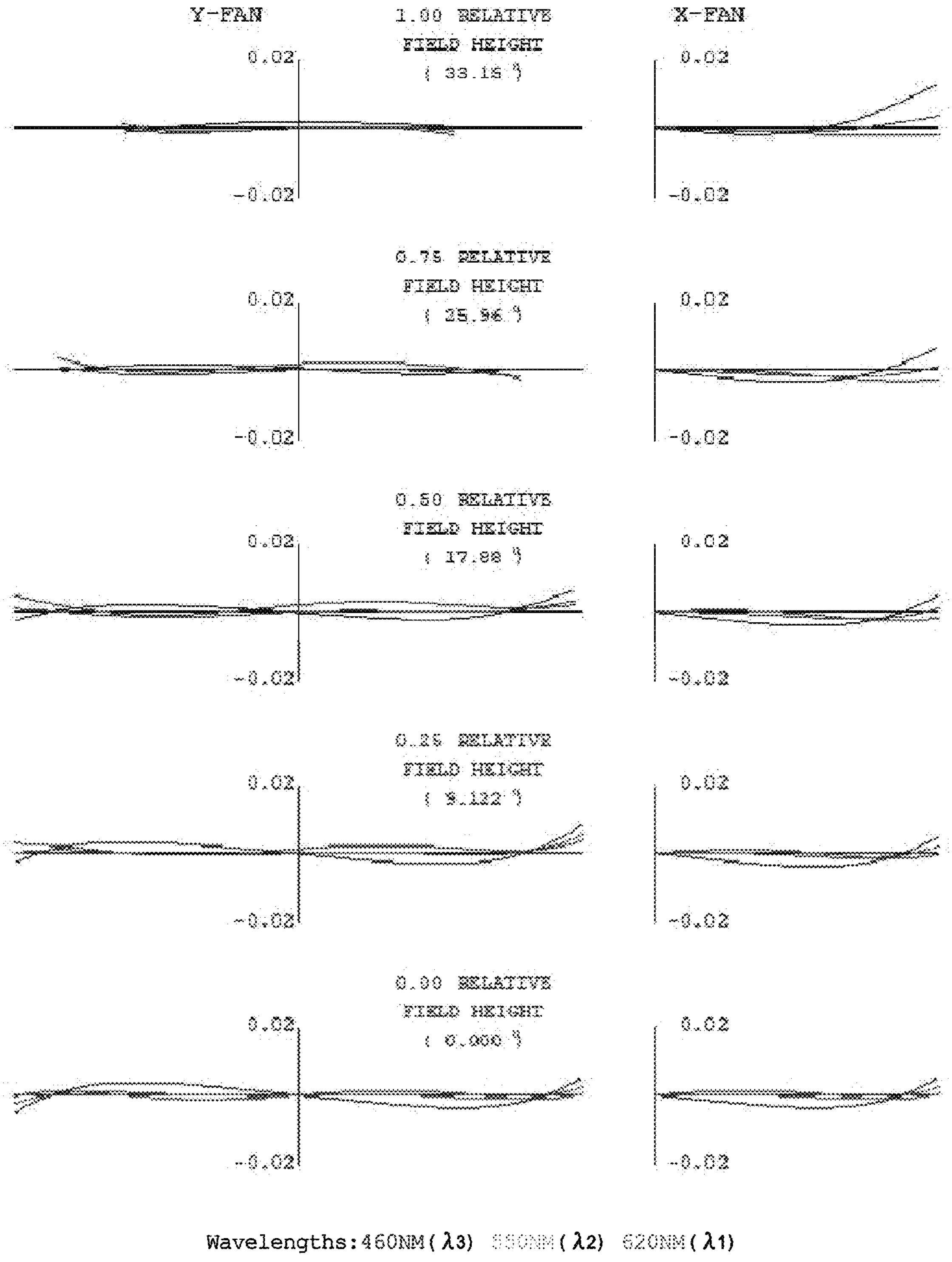
FIG. 2C is a graph illustrating the ray aberration diagram of the wide-angle end of the second embodiment of the present invention.

FIG. 2C is a graph illustrating the ray aberration diagram of the wide-angle end of the zoom projection lens 20 uses a first wavelength λ1 of 620 nm, a second wavelength λ2 of 550 nm and a third wavelength λ3 of 460 nm to match relative field heights, which are 1.00, 0.75, 0.50, 0.25, 0.00, to respectively simulate the corresponding ray aberrations of different Y-fan rays and X-fan rays, so that the relative field heights of 1.00, 0.75, 0.50, 0.25 and 0.00 present as half viewing angles of 33.15°, 25.96°, 17.88°, 9.122° and 0.000° respectively, and viewing the ray aberration diagram can tell the maximum aberration at each field of view point is controlled within the range of −0.01 mm~0.01 mm.

Figure 2D:
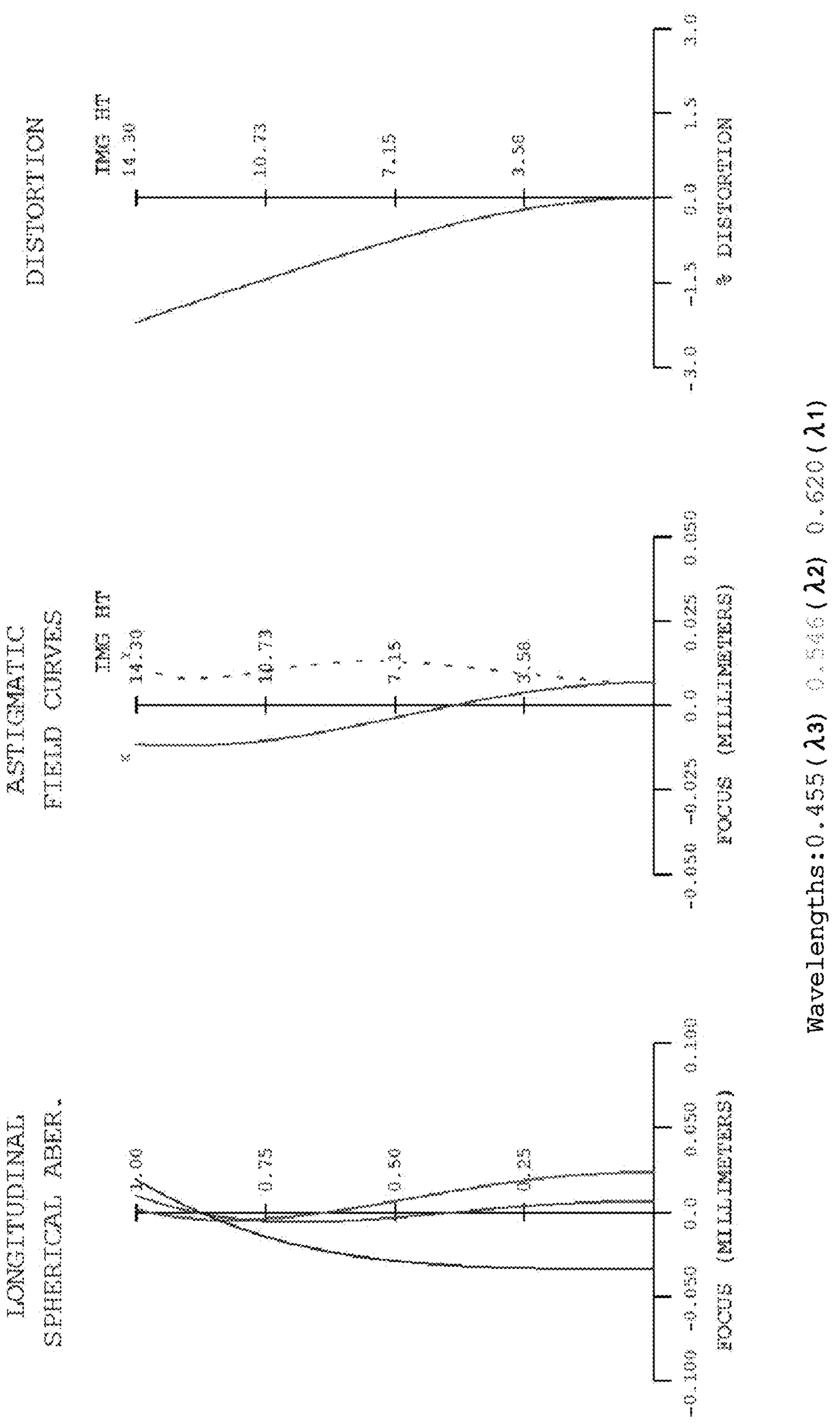
FIG. 2D is a graph illustrating the longitudinal spherical aberration diagram, astigmatism diagram and distortion diagram of the wide-angle end of the second embodiment of the present invention.

FIG. 2D is a graph illustrating the longitudinal spherical aberration diagram, astigmatism diagram and distortion diagram of the wide-angle end of the zoom projection lens 20; From the longitudinal spherical aberration diagram can tell that the maximum focus deviation of each reference wavelength is controlled within the range of −0.040 mm~0.025 mm; the curves X and Y of the astigmatic field curves are respectively the tangential field curvature characteristic curve and the sagittal field curvature characteristic curve. According to the astigmatic field curves knows that the tangential field curvature value and sagittal field curvature value at the 550 nm wavelength are controlled within the range of −0.020 mm~0.020 mm; the distortion diagram shows that the distortion at the 550 nm wavelength is controlled within the range of −2.50~0%.

Figure 2E:
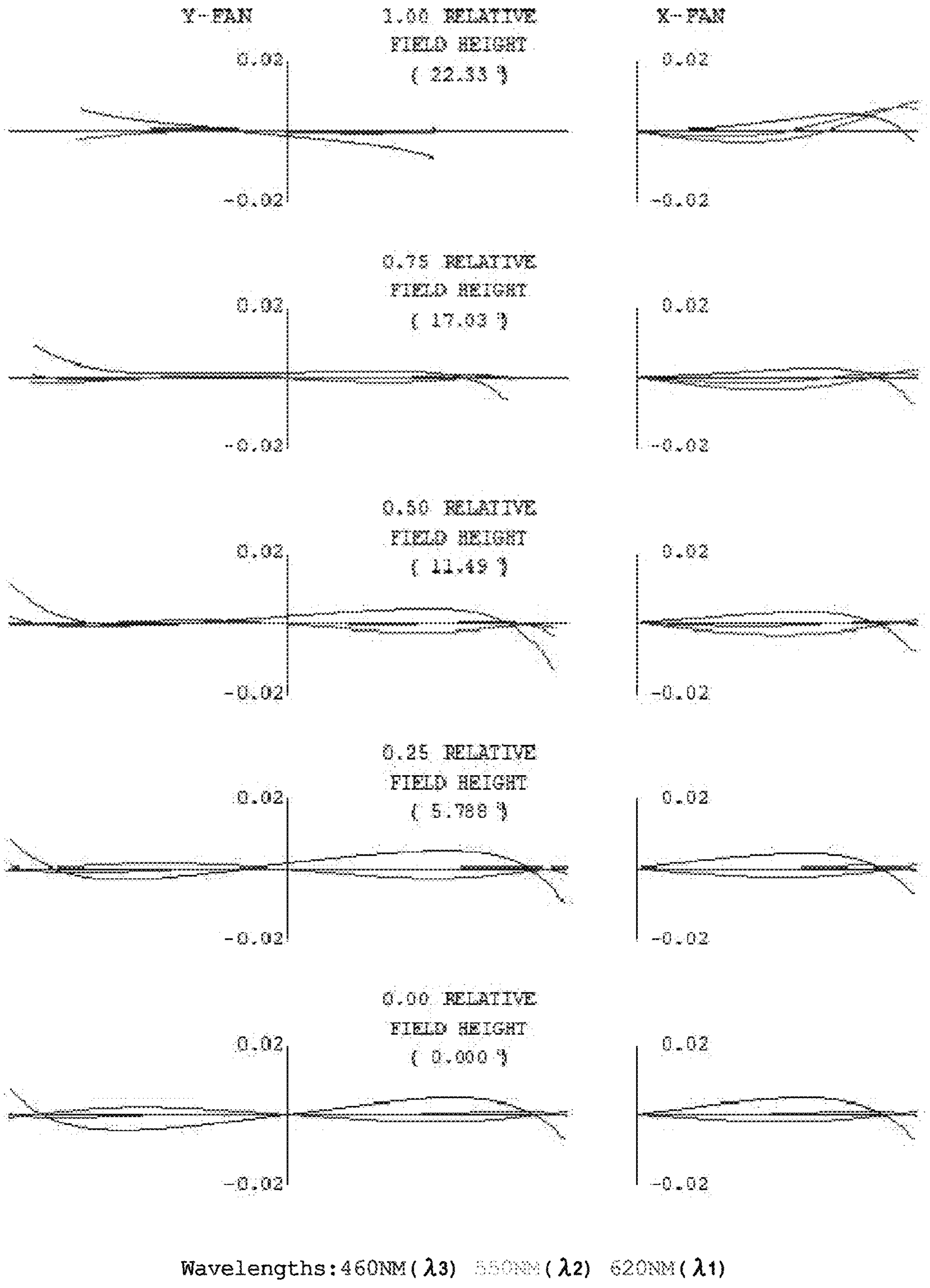
FIG. 2E is a graph illustrating the ray aberration diagram of the telephoto end of the second embodiment of the present invention.

FIG. 2E is a graph illustrating the ray aberration diagram of the telephoto end of the zoom projection lens 20 uses a first wavelength λ1 of 620 nm, a second wavelength λ2 of 550 nm and a third wavelength λ3 of 460 nm to match relative field heights, which are 1.00, 0.75, 0.50, 0.25, 0.00, to respectively simulate the corresponding ray aberrations of different Y-fan rays and X-fan rays, so that the relative field heights of 1.00, 0.75, 0.50, 0.25 and 0.00 present as half viewing angles of 22.33°, 17.03°, 11.49°, 5.788° and 0.000° respectively, and viewing the ray aberration diagram can tell the maximum aberration at each field of view point is controlled within the range of −0.02 mm~0.15 mm.

Figure 2F:
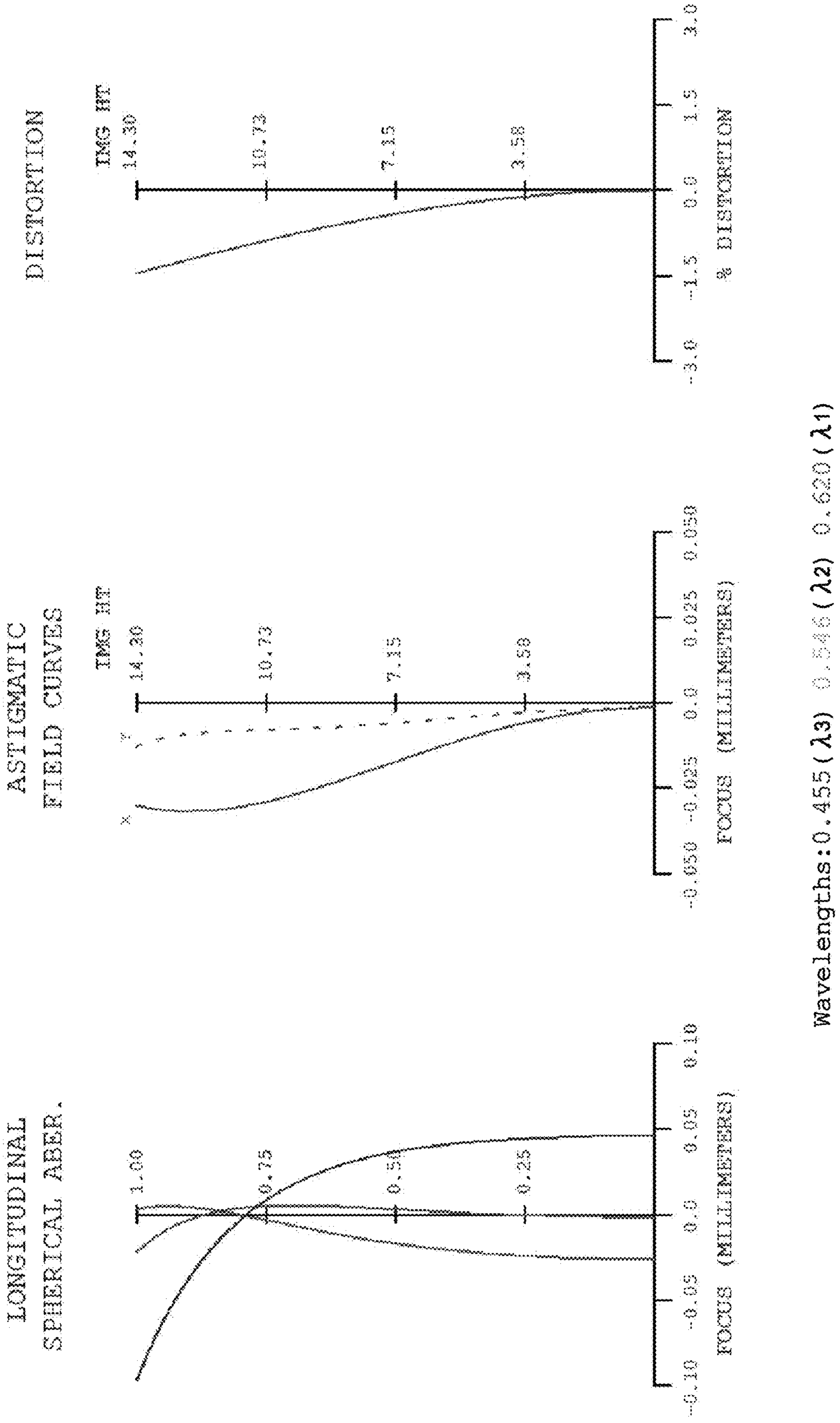
FIG. 2F is a graph illustrating the longitudinal spherical aberration diagram, astigmatism diagram and distortion diagram of the telephoto end of the second embodiment of the present invention.

FIG. 2F is a graph illustrating the longitudinal spherical aberration diagram, astigmatism diagram and distortion diagram of the wide-angle end of the zoom projection lens 20; From the longitudinal spherical aberration diagram can tell that the maximum focus deviation of each reference wavelength is controlled within the range of −0.010 mm~0.050 mm; the curves X and Y of the astigmatic field curves are respectively the tangential field curvature characteristic curve and the sagittal field curvature characteristic curve. According to the astigmatic field curves knows that the tangential field curvature value and sagittal field curvature value at the 550 nm wavelength are controlled within the range of −0.040 mm~0.0 mm; the distortion diagram shows that the distortion at the 550 nm wavelength is controlled within the range of −1.50~0%.

With the feature disclosed above, the present invention uses a first lens group 13/23, a second lens group 14/24, a third lens group 15/25, a fourth lens group 16/26 which with the most lens, and a fifth lens group 27 to form multiple zoom lens groups; Whereby for satisfying projection requirement of $1<Ft/Fw<2$ and $10<OAL/IMH<24$, and making the aberration, longitudinal spherical aberration, field curvature and distortion of the zoom projection lenses 10 and 20 can be controlled within a smaller range when they are at the wide-angle end and photography end; therefore, the present invention meet the projection requirements of zoom projection and maintain the quality of projection imaging at the same time.

Although particular embodiment of the invention has been described in detail for purposes of illustration, various modifications and enhancements may be made without departing from the spirit and scope of the invention. Accordingly, the invention is not to be limited except by the appended claims.

What is claimed is:

1. A zoom projection lens, from the magnifying side to the narrowing side of the lens sequentially comprising: a front fixed lens group, a zoom adjusting lens group, multiple zoom lens groups, and a rear fixed lens group, for satisfying $1<Ft/Fw<2$ and $10<OAL/IMH<24$, Ft is the focal length at the telephoto end, Fw is the focal length at the wide-angle end, OAL is the distance from the first lens of the lens to the focal plane, and IMH is the half height of the focal plane;

wherein the front fixed lens group has positive diopter, the zoom adjusting lens group has negative diopter, and multiple zoom lens groups include in sequence from the zoom adjusting lens group: a first zoom lens group with positive diopter, a second zoom lens group with positive diopter, a third zoom lens group with negative diopter and a fourth zoom lens group with positive diopter, and the rear fixed lens group has positive diopter, and the fourth zoom lens group is the zoom lens group with the most lenses among multiple zoom lens groups.

2. The zoom projection lens as claimed in claim 1, wherein the zoom adjusting lens group includes at least a lens with positive diopter.

3. The zoom projection lens as claimed in claim 1, wherein the zoom lens group with the most lens of the multiple zoom lens groups is having positive diopter and includes at least two lens with positive diopter.

4. The zoom projection lens as claimed in claim 1, wherein there are two zoom lens groups in the multiple zoom lens groups, and each of these two includes at least one lens with positive diopter.

* * * * *